United States Patent [19]
Paddock et al.

[11] 3,961,701
[45] June 8, 1976

[54] METHOD OF AND CONVEYOR FOR TRANSPORTING FRAGILE OBJECTS

[75] Inventors: Paul F. Paddock, Riverside; Jerry W. Cramer, Upland, both of Calif.

[73] Assignee: Sunkist Growers, Inc., Sherman Oaks, Calif.

[22] Filed: July 10, 1974

[21] Appl. No.: 487,242

[52] U.S. Cl. ............................... 198/131; 198/153
[51] Int. Cl.² ......................................... B65G 17/12
[58] Field of Search ............... 198/153, 131, 1, 247, 198/193; 5/355 R, 361 B

[56] References Cited
UNITED STATES PATENTS

| | | | |
|---|---|---|---|
| 74,340 | 2/1868 | Gilbert | 5/355 R |
| 2,935,957 | 5/1960 | Denton | 198/153 X |
| 3,580,381 | 5/1971 | Kilner | 198/246 |

*Primary Examiner*—Frank E. Werner
*Assistant Examiner*—James M. Slattery
*Attorney, Agent, or Firm*—Paul A. Weilein

[57] ABSTRACT

A conveyor having an endless series of holders equipped with cushions to carry fragile objects has an upper run extending from a receiving station to a discharge station and a lower return run with an upward arcuate return path from the lower run to the start of the upper run. The holders are turned upside down on the lower run of the conveyor and are subject to centrifugal force on the upward arcuate return path. The cushions are envelopes of flexible sheet material containing masses of pellets. A free-falling object lands on a cushion at the receiving station of the conveyor and is decelerated without harm by forming a seating recess in the mass of pellets. The return journey of the cushions redistributes the pellets to eliminate the seating recesses and thus enables newly received objects at the receiving station to be decelerated by forming new seating recesses.

12 Claims, 7 Drawing Figures

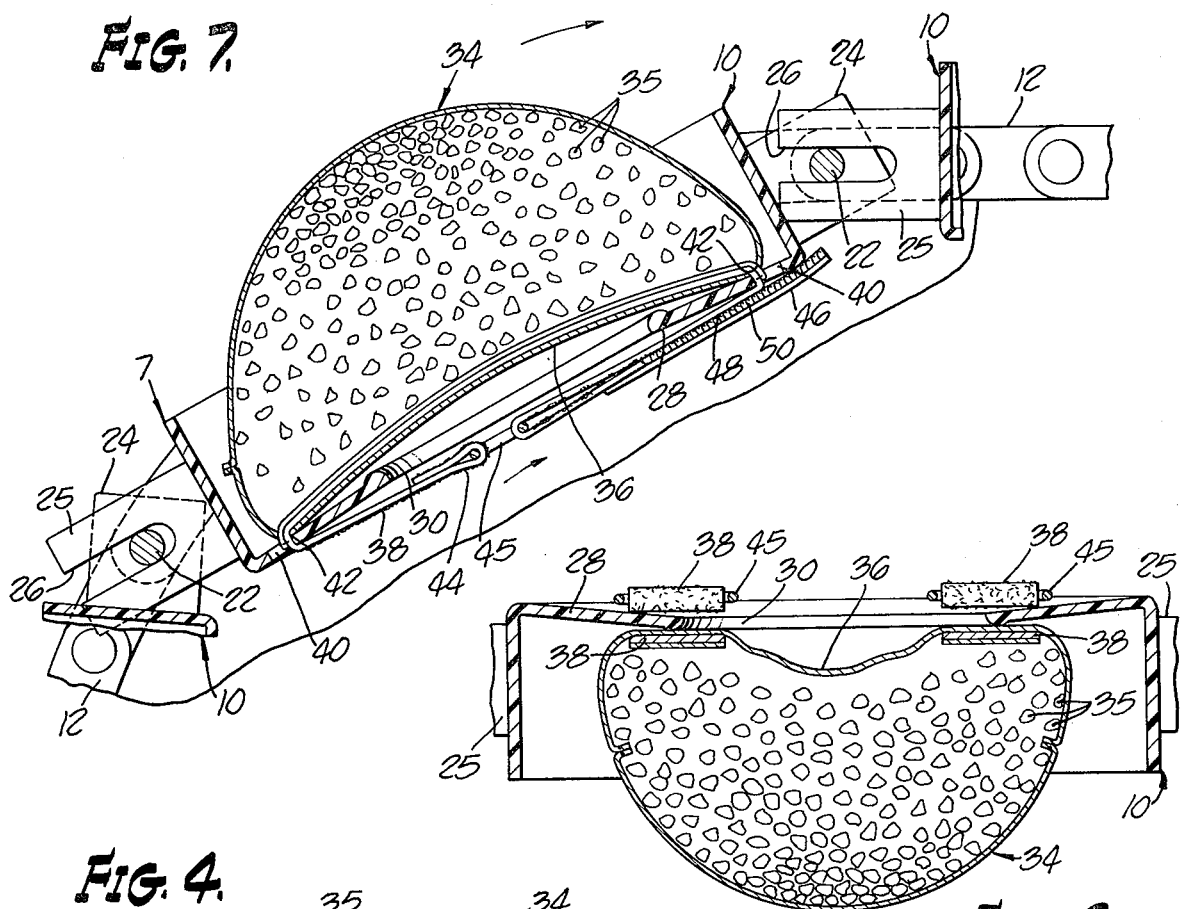
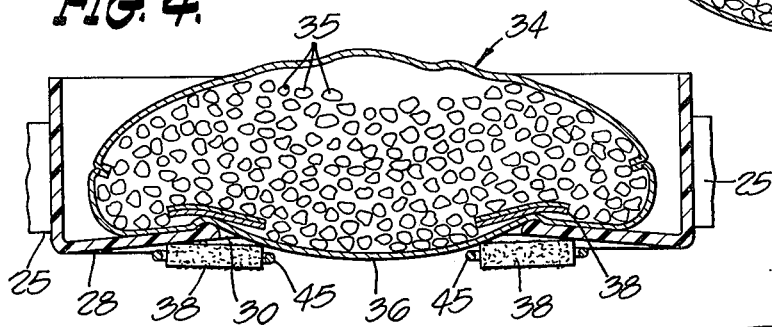
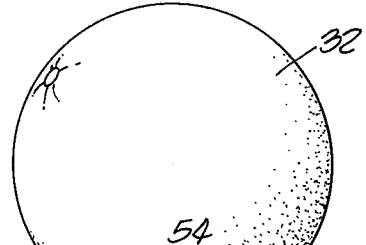
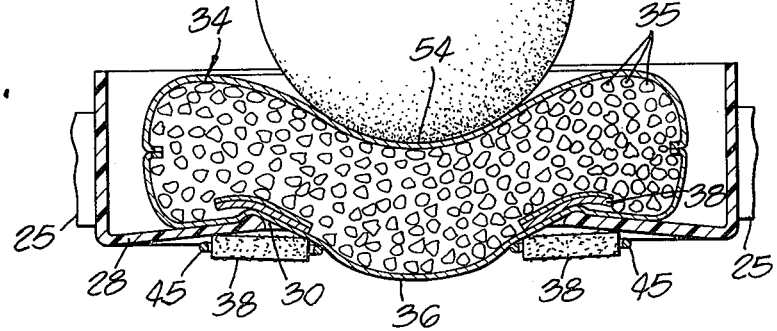

METHOD OF AND CONVEYOR FOR TRANSPORTING FRAGILE OBJECTS

BACKGROUND OF THE INVENTION

The invention relates to a problem encountered in various manufacturing and processing plants of handling and transporting with no damage objects that are relatively delicate and highly vulnerable to damage by impact forces. The initial embodiment of the invention is directed to the handling and conveying of oranges in a packing plant where the problem is especially challenging for a number of reasons. In the first place, oranges are easily bruised and a bruise so slight as to be hardly noticeable may cause an orange to deteriorate before it reaches the consumer. In the second place, oranges are of such high liquid content that they have high specific gravity and therefore generate high momentum or kinetic energy when permitted to gravitate or fall freely for even a small distance. In the third place, grading and classifying oranges from a bulk supply at economic cost requires movement of the oranges in single file at a high rate of speed past automated inspection stations that detect defects for the purpose of classifying the oranges. Finally, the inspected fruit must be distributed at high speed into the various classifications.

In such a processing system it may be desirable to maintain a high rate of production by dropping the inspected oranges in rapid succession onto a conveyor leading to a particular discharge point instead of rolling the oranges more slowly onto the conveyor. It is also to be noted that a technique for detecting defects in oranges has been developed which involves projecting the oranges in timed sequence on short trajectories with the trajectories directed to the receiving station of a conveyor that has a continuous series of holders traveling in synchronism with the timed sequence of the trajectories.

SUMMARY OF THE INVENTION

In the course of developing the invention, it has been found that two requirements must be met in the depositing of oranges in free falling state in timed sequence on high speed holders that are synchronized with the timed sequence. In the first place, the falling oranges must be decelerated gently as distinguished from drastic arrestment by rigid surfaces. In the second place, since the conveyor abruptly changes the direction of movement of the falling oranges and necessarily travels at high speed, the holders on the conveyors must engage the oranges effectively for stable conveyance.

The invention is based on the discovery that both of these requirements may be met by using a conventional conveyor with holders that are equipped with cushions in the form of flexible envelopes containing masses of pellets. The first requirement of gently decelerating the oranges is met by the fact that the impinging oranges transfer energy to the envelopes by displacing the pellets in the envelopes with the pellets resisting such displacement both by inertia and friction among the pellets. The second requirement of stable retention of the oranges by the holders is met by the fact that the impacts of the oranges form recesses in the masses of the pellets and the recesses serve as confining seats to retain the oranges in a stable manner as they travel rapidly along the path of conveyance.

A further requirement arises, however, in that when such an envelope repeatedly traverses the path of conveyance the mass of pellets therein must be redistributed to eliminate the previously formed seating recess to enable a newly received orange to be decelerated by forming a new seating recess in the mass of pellets. An important feature of the invention in this regard is that a conventional conveyor inherently meets this added requirement. A conventional conveyor with a continuous chain of holders has an upper forward run along the path of conveyance, a lower return run and the holders follow an upward arcuate path from the lower return run to the start of the upper forward run. The holders are turned upside down on the lower return run to cause gravity to urge the pellets outwardly of the envelopes and on the upward arcuate return path centrifugal force also urges the pellets outwardly of the envelopes. The consequence is redistribution of the pellets to eliminate the previously formed seating recesses in the pellet masses.

In one practice of the invention, the masses of pellets are permitted to settle down to repose configurations before the holders reach the receiving station, the receiving station being advanced sufficiently in the direction of travel of the upper run of the conveyor to permit the disturbed pellets to settle.

In an alternate practice of the invention, the receiving station of the conveyor is in the region of the arcuate return path near the start of the upper forward run. A newly received orange makes impact with an envelope while centrifugal force is causing the pellets in the envelope to bulge the envelope outwardly. Consequently, the newly arrived orange is decelerated in part by opposing the centrifugal force that is acting on the pellets in the path of fall of the orange.

The preferred practice of the invention is based on the further discovery that it is highly advantageous to support each pellet-containing envelope from below on a substantially rigid support wall that has an aperture below the location of the desired seating recess, the diameter of the aperture being comparable to the diameter of the orange. It has been found that when a flexible envelope is mounted on such a support wall with a central opening of substantial diameter therein, the redistributed pellets tend to form a bridge across the bottom opening and the collapse of the bridge under the impact of a newly arrived fruit results in a more effective seating recess than can be obtained in the absence of the bottom opening.

Even when no bridging tendency is evident the provision of the bottom opening results in improved configuration of the seating recess because the bottom wall of the flexible envelope initially bulges only slightly into the bottom opening and then bulges further under the impact of a fruit. Thus, the bottom opening substantially lessens the resistance to directly downward displacement of the redistributed pellets by the impact of the fruit.

The features and advantages of the invention may be understood from the following detailed description and the accompanying drawings.

BRIEF DESCRIPTION OF THE DRAWINGS

In the drawings, which are to be regarded as merely illustrative.

3

Figure 1:
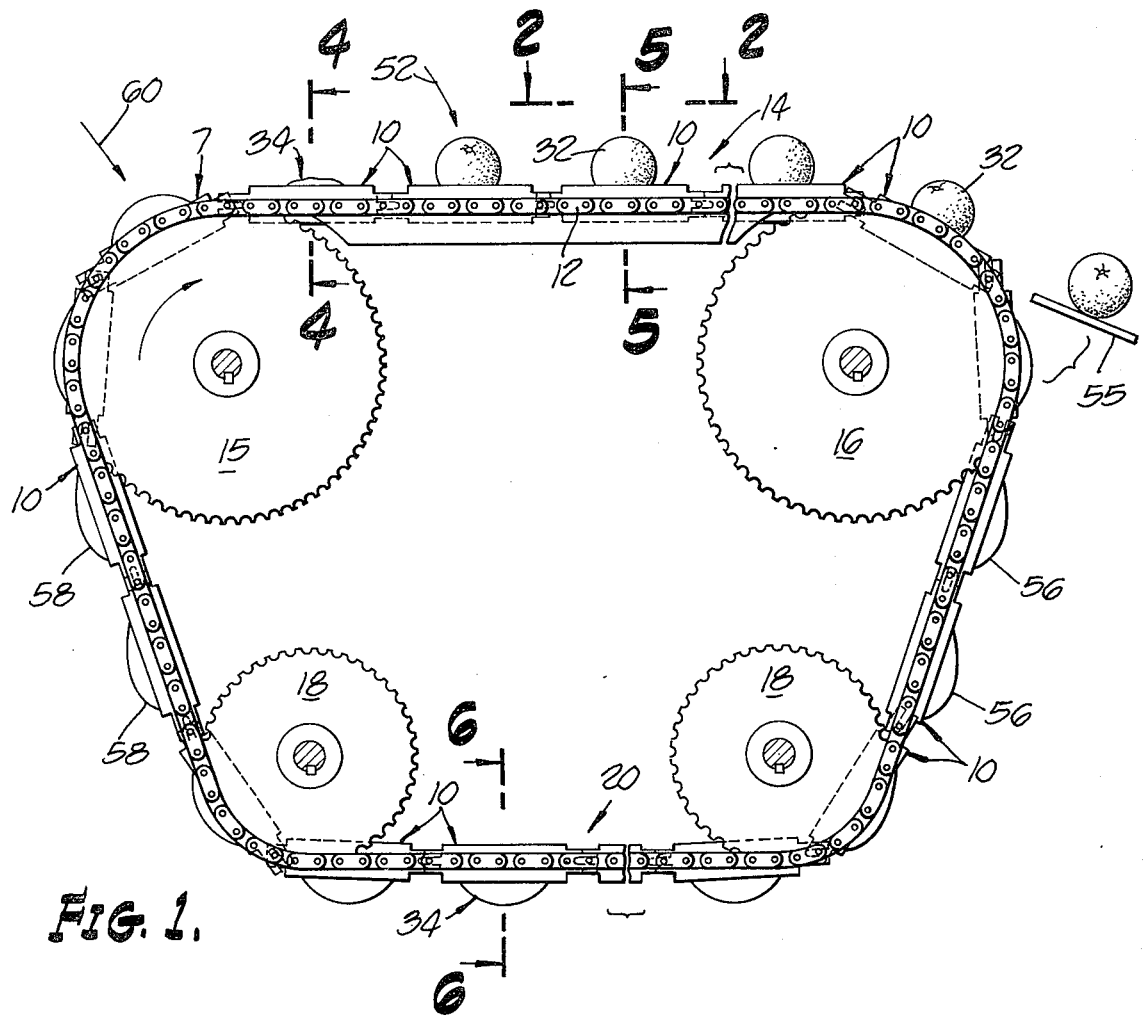
FIG. 1 is a simplified side elevational view of a conveyor embodying the invention, much of the structure being omitted for clarity of illustration.
Figure 2:
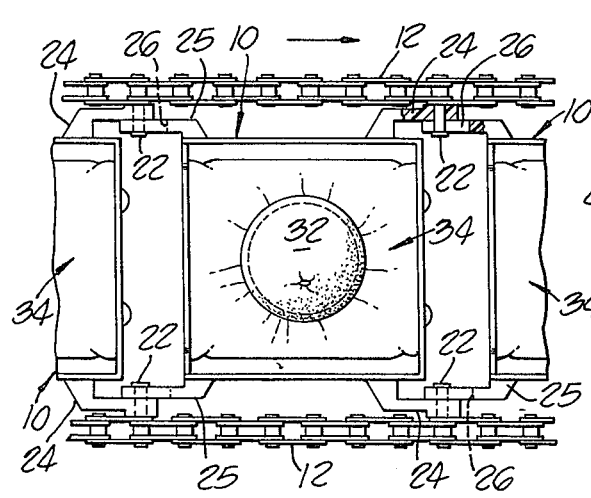
Figure 3:
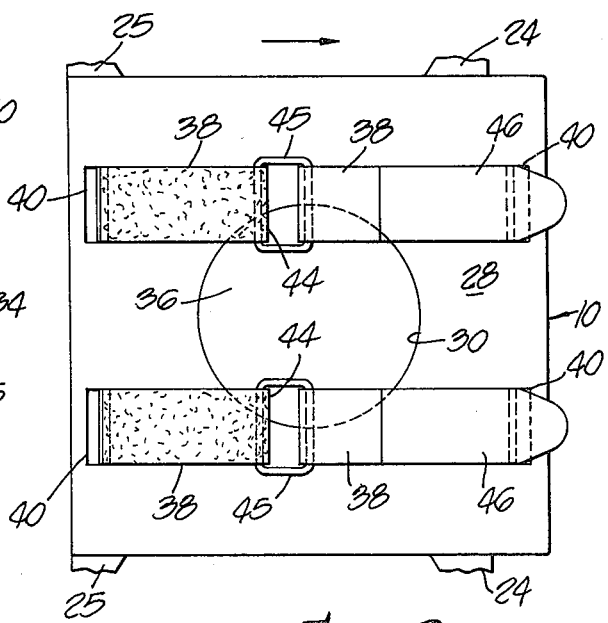

FIG. 2 is a fragmentary plan view showing an orange in a holder as seen in the region of the line 2—2 of FIG. 1;

FIG. 3 is a somewhat enlarged bottom plan view of the same holder;

FIG. 4 is an enlarged sectional view along the line 4—4 of FIG. 1 showing a holder with the mass of pellets in a state of repose;

FIG. 5 is an enlarged sectional view along the line 5—5 of FIG. 1 showing how an orange is seated on an envelope of pellets;

FIG. 6 is an enlarged section along the line 6—6 of FIG. 1 showing a holder on the return run of the conveyor with the pellets urged outwardly of the holder by gravity; and FIG. 7 is an enlarged longitudinal section of a holder designated by numeral 7 in FIG. 1, which holder is following the arcuate path that leads to the start of the upper run of the conveyor.

DESCRIPTION OF THE ILLUSTRATED EMBODIMENT OF THE INVENTION

FIG. 1 shows a conveyor having a continuous series of holders 10 in the form of shallow trays that are carried in a well known manner by a pair of parallel conveyor chains 12. The conveyor has an upper run 14 from a forward pair of sprocket wheels 15 to a rear pair of sprocket wheels 16, one of which pairs of sprocket wheels is power-actuated. Forward and rearward pairs of lower idler sprockets 18 form a lower return run, generally designated 20, and the holders follow an upward arcuate path in the region of the holder 7 where the holders round the forward pair of sprocket wheels 15.

As shown in FIG. 2, the two sprocket chains 12 have spaced inwardly directed pins 22 that connect the holders to the chains. In the construction shown in FIGS. 2 and 7, each holder 10 has forward arms 24 on its opposite sides that pivotally engage a pair of the pins 22 and each of the holders has a similar pair of rearward arms 25 that are formed with slots 26 to slidingly engage the pins 22. Thus, the holders are enabled to accommodate themselves to the changing spacing of the pins 22 as the holders pass around the sprocket wheels 15, 16 and around the idler sprockets 18.

Each holder 10, which may be made of suitable plastic material, has a bottom wall 28 which is slightly inwardly convex and which is provided with a central circular opening 30. As shown in FIG. 5, the circular openings 30 may be comparable in diameter to the diameter of an orange 32 that is carried by the holder.

Suitably anchored inside each of the holders 10 is an envelope 34 or bag of flexible sheet material such as a suitable woven fabric which contains a mass of pellets 35. Since friction is desirable among the pellets to absorb the energy of a falling orange and since pellets of spherical configuration generate minimum friction, it is desirable that the pellets be of non-spherical configuration. Preferably, the pellets are made of durable plastic material and are of random shapes that are conducive to friction among the pellets. It has been found that satisfactory results are produced by pellets ranging in size from relatively small to relatively large although making the pellets relatively large reduces the energy-absorbing friction among the pellets.

The bottom walls 36 of the flexible envelopes 34 may be anchored to the bottoms of the holders 10 in any suitable manner. In the present construction, as best shown in FIGS. 3 and 7, each envelope 34 is anchored by a pair of parallel straps 38 which pass through slots 40 of the bottom wall 28 of the holder and pass through corresponding slots 42 of the bottom wall 36 of the envelope 34. The two straps extend along the inner surface of the bottom wall of the envelope as may be seen in FIG. 7.

On the underside of each holder 10, ends of the two straps are folded back on themselves and sewn to form loops 44 in engagement respectively with corresponding rectangular metal loops 45 as shown in FIG. 3. The other ends of the two straps 38 engage the rectangular metal loops 45 respectively and are secured in any suitable manner.

As shown in FIGS. 3 and 7, the free ends 46 of the two straps are folded back against corresponding portions 48 of the two straps and the free ends are releasably attached to the strap portions 48 by a well known type of releasable fastening means. For this purpose the strap portions 48 are formed on their undersides with numerous exceedingly small loops of fine plastic filaments and the corresponding upper surfaces of the free strap ends 46 are provided with a layer of exceedingly fine plastic hooks 50 that releasably engage the fine plastic loops.

In one practice of the invention the successive oranges reach the conveyor along a trajectory indicated by the arrow 52 in FIG. 1, the receiving station of the conveyor being at a point where the mass of pellets has settled down to a repose configuration of the general character shown in FIG. 4. The repose configuration of the mass of pellets in FIG. 4 does not form an upper recess, but FIG. 5 shows how the impact of a newly arrived orange 32 forms a recess 54 to seat the orange and to carry the orange in a stable manner to the discharge station at the end of the conveyor.

In forming the seating recess 54 the falling orange is decelerated in a gentle manner, the energy of the fall being dissipated by displacement of the pellets in all directions in opposition to inertia of the pellets and frictional resistance among the pellets. It may be noted that in FIG. 4 the bottom wall 36 of the envelope bulges somewhat through the circular opening 30 of the bottom wall 28 of the holder 10 but in FIG. 5 the seated orange 32 has substantially increased the downward bulge of the envelope. A substantial amount of the energy of a falling orange is dissipated in the downward displacement of the pellets that is involved in the augmentation of this downward bulge of the flexible bottom wall of the envelope.

At the discharge station of the conveyor the successive oranges are received gently by a discharge chute 55. As the holders 10 approach the discharge station they change direction downwardly and the successive oranges continue rearwardly by inertia to depart from the recesses 54 in the envelopes, the oranges rolling onto the discharge chute without making diamaging impact against the chute.

As the holders 10 move downward from the rearward sprocket wheel 16, gravity acting on the masses of pellets cause the envelopes to sag and bulge downwardly as indicated at 56 in FIG. 1 and when the holders pass under the rearward pair of idler sprockets 18 onto the lower run 20 of the conveyor, the holders are turned upside down with the result that the masses of pellets gravitate against the outer walls of the envelopes as shown in FIG. 6. When the holders then move upward from the forward pair of idler sprockets 18, the envelopes again sag and bulge downwardly as indicated at 58 in FIG. 1. As the holders move along the arcuate path around the forward pair of sprocket wheels 15, centrifugal force is the dominant force acting on the pellets, centrifugal force urging the pellets outwardly to bulge the envelopes outwardly as shown in FIG. 7.

When the holders 10 again reach the upper run 14 of the conveyor, each mass of pellets again settles into a repose configuration shown in FIG. 4 in preparation for the reception of a new orange. Thus, seating recesses 54 are formed in the pellet masses by absorption of energy from the falling oranges and before the pellet masses again reach the receiving station, the pellets are disturbed and redistributed to eliminate the seating recesses 54 to permit the newly arriving oranges to be decelerated by forming new seating recesses.

It is to be noted that the pellets are effectively disturbed and redistributed by a number of successive actions. Thus, as the holders turn downward from the discharge station, the mass of pellets in each envelope sags towards the leading end of the envelope; as the holders traverse the return run 20 of the conveyor in upside down position, the masses of pellets are disturbed by gravitational movement outwardly to form a distribution pattern such as shown in FIG. 6; as the holders climb upward towards the forward pair of sprocket wheels 15, the envelopes again sag but now sag towards the trailing ends of the holders; and finally, as the holders move along the arcuate path to approach the start of the upper run 14 of the conveyor, the pellets are again urged outwardly of the envelope by centrifugal force. The result of these successive actions is that the mass of pellets in an envelope is thoroughly disturbed to result in the new initial configuration of the mass of pellets of the character shown in FIG. 4 in preparation for receiving a new orange.

In the presently preferred practice of the invention, the successive oranges fall onto the conveyor along a trajectory that is indicated by the arrow 60 in FIG. 1, the receiving station of the conveyor being at the location of the holder 7 in FIG. 1 which is on the upward arcuate path of the holders near the start of the upper run of the conveyor. FIG. 7 shows how centrifugal force acting on the pellets in the holder 7 urges the pellets outwardly to cause the envelope to bulge outwardly. A newly arriving orange is decelerated in part by driving back the pellets 35 in opposition to the centrifugal force that is acting on the pellets and the orange is also decelerated by displacing the pellets in opposition to inertia and frictional resistance among the pellets to form a recess in the mass of pellets in which the decelerated orange seats until the holder reaches the discharge station at the end of the conveyor.

The description herein in specific detail of the two practices of the invention will suggest various changes, substitutions and other departures from the disclosure within the spirit and scope of the appended claims.

We claim:

1. A method of transporting objects which are vulnerable to damage by impact, between an object receiving station at which the objects are successively received along a free-fall path, and an object discharge station,
    which comprises the steps of:
    providing a continuous row of separate object-carrying cushions, loosely arranging at each of the cushions a displaceable mass of pellets,
    maintaining said pellets at said cushions for movement in a path from the receiving station to the discharge station;
    directing successive objects along said free-fall path onto successive masses of each cushion, upon its arrival at an object receiving position,
    causing said objects to effect the displacement of the pellets of the mass resulting from the impact of the received object to frictionally absorb and dissipate the impact forces, and to form a recess in the pellet mass for stabilizing and holding the object during movement to the discharge station; then
    rearranging said pellets to eliminate said recess prior to directing the next object thereto and following discharge of said article from said cushion at said discharge station.

2. A method as set forth in claim 1 in which the step of rearranging said pellets includes turning each cushion upside down to cause the pellets therein to gravitate outwardly.

3. A method as set forth in claim 1 in which the step of rearranging said pellets includes subjecting the empty cushions to outward centrifugal force.

4. A method as set forth in claim 3 in which the objects are directed to fall onto the cushions while the cushions are being subjected to the centrifugal force.

5. A method as set forth in claim 1 including the step of causing the masses of pellets to settle into repose configurations after said rearranging step.

6. In a conveyor to receive free-falling objects that are vulnerable to damage by impact and to transport the received objects from a receiving station to a discharge
    wherein the conveyor has an endless series of holders for the objects and wherein the conveyor has a forward upper run from the receiving station to the discharge station, a lower return run and an upward accurate path from the lower run to the start of the upper run, with the holders turned upside down on the lower run,
    the improvement to minimize damage to the received objects by impact against the holders at the receiving station, comprising:
    said holders having energy absorbing cushions to receive the objects at the receiving station,
    said cushions each comprising a mass of freely displaceable pellets loosely arranged in a flexible envelope, said pellets being displaceable under the impact of the received object at the receiving station to frictionally absorb and dissipate the impact forces, and form a recess in the pellet mass to seat and stabilize the object during movement to the discharge station,
    the return travel of the holders along said lower run to the start of the upper run of the conveyor redistributing the pellets by gravity and centrifugal force with consequent elimination of the seating recess to permit the receiving of a new object at the receiving station.

7. An improvement as set forth in claim 6 in which the receiving station is sufficiently advanced forward on the upper run of the conveyor to permit the mass of pellets in the envelope to settle to a repose configuration before receiving the object at the receiving station.

8. An improvement as set forth in claim 6 in which the receiving station is in the region of the upward arcuate return path of the conveyor where centrifugal force urges the pellets outwardly of the holders so that the falling objects are decelerated in part by moving the outward pellets inwardly of the cushions in opposition to the centrifugal force acting on the pellets.

9. An improvement as set forth in claim 6 in which the holders have bottom walls with openings therein positioned below the location of the seated objects so that the impact of a falling object with an envelope on a holder causes the envelope to bulge into said opening.

10. A conveyor to receive delicate objects delivered in timed sequence at a receiving station and to transport the objects to a discharge station, said conveyor comprising:
   an endless conveyor having a continuous series of interconnected holders for the objects,
   the conveyor having an upper run extending from the receiving station to the discharge station and a lower return run,
   the rate of travel of the conveyor being synchronized with the timed sequence of the delivery of the objects,
   said holders being equipped with energy absorbing cushions anchored thereto to receive the objects,
   said cushions comprising envelopes of flexible sheet material containing masses of freely displaceable pellets loosely arranged therein, which masses seat and stabilize the objects by displacement of the pellets within the envelopes to form seating recesses conformed to the objects in response to impact delivery of the objects to the cushions,
   the return run of the conveyor turning the holders upside down to rearrange the pellets by gravity with consequent elimination of the seating recesses in the masses of pellets to prepare the cushions for forming new seating recesses by the delivery of the new objects at the receiving station.

11. An improvement as set forth in claim 10 in which the receiving station is at a point on the upper run of the conveyor advanced sufficiently in the direction of travel to permit the disturbed pellets to settle before the cushions receive the falling objects.

12. An improvement as set forth in claim 10 in which the holders have relatively rigid bottom walls to support the envelopes from below and in which each of said bottom walls has an opening therein into which the corresponding envelopes may bulge under the impact of a newly received object.

* * * * *

UNITED STATES PATENT OFFICE
CERTIFICATE OF CORRECTION

PATENT NO. : 3,961,701
DATED : June 8, 1976
INVENTOR(S) : Paul F. Paddock and Jerry J. Cramer It is certified that error appears in the above-identified patent and that said Letters Patent are hereby corrected as shown below:

Column 6, line 5, insert --pellet-- before "masses";

line 33 (Claim 6, line 4), after "charge" insert --station,--;

line 38, "accurate" should read --arcuate--.

Signed and Sealed this

Twenty-first Day of September 1976

[SEAL]

Attest:

RUTH C. MASON
*Attesting Officer*

C. MARSHALL DANN
*Commissioner of Patents and Trademarks*